US012015912B2

(12) United States Patent
Zaki

(10) Patent No.: US 12,015,912 B2
(45) Date of Patent: Jun. 18, 2024

(54) DETERMINING AND AMELIORATING WIRELESS TELECOMMUNICATION NETWORK FUNCTIONALITIES THAT ARE IMPAIRED WHEN USING END-TO-END ENCRYPTION

(71) Applicant: T-Mobile USA, Inc., Bellevue, WA (US)

(72) Inventor: Ayman Zaki, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/327,888

(22) Filed: Jun. 2, 2023

(65) Prior Publication Data

US 2023/0308867 A1 Sep. 28, 2023

Related U.S. Application Data

(63) Continuation of application No. 17/900,854, filed on Aug. 31, 2022, now Pat. No. 11,706,615, which is a (Continued)

(51) Int. Cl.
*H04W 12/037* (2021.01)
*H04W 12/106* (2021.01)
(Continued)

(52) U.S. Cl.
CPC ....... *H04W 12/037* (2021.01); *H04W 12/106* (2021.01); *H04W 84/045* (2013.01); *H04W 84/12* (2013.01)

(58) Field of Classification Search
CPC ............. H04W 12/037; H04W 12/106; H04W 84/045; H04W 84/12
(Continued)

(56) References Cited

U.S. PATENT DOCUMENTS 6,886,096 B2   4/2005   Appenzeller et al.
7,013,155 B1   3/2006   El-fishawy et al.
(Continued)

FOREIGN PATENT DOCUMENTS

CN   101056176 A   10/2007
CN   104796869 A   7/2015
(Continued)

OTHER PUBLICATIONS

International Searching Authority, International Search Report and Written Opinion, PCT Patent Application PCT/US2022/029321, dated Aug. 30, 2022, 11 pages.
(Continued)

*Primary Examiner* — Peter C Shaw
(74) *Attorney, Agent, or Firm* — Perkins Coie LLP

(57) ABSTRACT

Disclosed here is a system and method to determine which wireless telecommunication network functionalities are impaired when using end-to-end encryption and to ameliorate the impairment of the functionality. The system receives a request from a sender device to communicate with a receiver device, where the request indicates whether the sender device is capable of an end-to-end encryption. The system determines whether the receiver device is capable of the end-to-end encryption, and whether the receiver device is associated with a functionality provided by a wireless telecommunication network that is impaired when the end-to-end encryption is used. Upon determining that the receiver device is not capable of the end-to-end encryption or that the receiver device is associated with the functionality that is impaired, the system performs an action to ameliorate the impairment to the functionality.

14 Claims, 9 Drawing Sheets

Related U.S. Application Data continuation of application No. 17/342,985, filed on Jun. 9, 2021, now Pat. No. 11,528,601.

(51) Int. Cl.
  *H04W 84/04* (2009.01)
  *H04W 84/12* (2009.01)

(58) Field of Classification Search
  USPC .......................................................... 713/160
  See application file for complete search history.

(56) References Cited

U.S. PATENT DOCUMENTS

| | | | |
|---|---|---|---|
| 7,254,712 B2 | 8/2007 | Godfrey et al. | |
| 7,317,929 B1 | 1/2008 | El-fishawy et al. | |
| 7,444,137 B1 | 10/2008 | Mcnamara et al. | |
| 7,505,935 B2 | 3/2009 | Mendiola et al. | |
| 7,653,815 B2 | 1/2010 | Godfrey et al. | |
| 7,657,736 B2 | 2/2010 | Godfrey et al. | |
| 7,685,414 B1 | 3/2010 | Appenzeller et al. | |
| 7,783,711 B2 | 8/2010 | Levasseur et al. | |
| 7,814,313 B2 | 10/2010 | Riittinen | |
| 7,822,820 B2 | 10/2010 | Levasseur et al. | |
| 7,924,792 B2 | 4/2011 | Shen et al. | |
| 7,933,950 B1 | 4/2011 | Barton et al. | |
| 7,991,993 B2 | 8/2011 | Josset et al. | |
| 8,060,566 B2 | 11/2011 | Appleman | |
| 8,086,849 B2 | 12/2011 | Kaler et al. | |
| 8,090,393 B1 | 1/2012 | Whitehouse | |
| 8,117,273 B1* | 2/2012 | Mathur | H04L 63/0428 713/153 |
| 8,131,266 B2 | 3/2012 | Cai et al. | |
| 8,171,293 B2 | 5/2012 | Sudhakar | |
| 8,238,891 B1 | 8/2012 | Tam et al. | |
| 8,275,351 B1 | 9/2012 | Cazanas et al. | |
| 8,291,212 B2 | 10/2012 | Godfrey et al. | |
| 8,331,963 B1 | 12/2012 | Lin et al. | |
| 8,379,862 B2 | 2/2013 | Gandhi et al. | |
| 8,396,806 B2 | 3/2013 | Little | |
| 8,442,231 B2 | 5/2013 | Macchi | |
| 8,495,660 B1* | 7/2013 | Hernacki | H04L 51/08 719/314 |
| 8,543,091 B2 | 9/2013 | Mardikar | |
| 8,559,636 B2 | 10/2013 | De Los Reyes | |
| 8,619,986 B2 | 12/2013 | Drucker | |
| 8,639,935 B2 | 1/2014 | Raleigh | |
| 8,682,979 B2 | 3/2014 | Levasseur et al. | |
| 8,739,247 B2 | 5/2014 | Shen et al. | |
| 8,745,268 B2 | 6/2014 | Doggett | |
| 8,767,963 B2 | 7/2014 | Huang | |
| 8,781,128 B2 | 7/2014 | Gandhi et al. | |
| 8,898,473 B2 | 11/2014 | Godfrey et al. | |
| 8,914,849 B2 | 12/2014 | Ramprasad et al. | |
| 8,918,128 B2 | 12/2014 | Merrett | |
| 8,938,074 B2 | 1/2015 | Drucker | |
| 8,965,421 B1 | 2/2015 | Sanjeev | |
| 9,049,025 B1 | 6/2015 | Huang et al. | |
| 9,060,271 B2 | 6/2015 | Mardikar | |
| 9,071,565 B2 | 6/2015 | Suryavanshi et al. | |
| 9,077,695 B2 | 7/2015 | Larson et al. | |
| 9,083,680 B2 | 7/2015 | Marsico | |
| 9,172,540 B2 | 10/2015 | Brown et al. | |
| 9,179,274 B2 | 11/2015 | Lisbey et al. | |
| 9,226,147 B2 | 12/2015 | Brander et al. | |
| 9,277,378 B2 | 3/2016 | Jackson et al. | |
| 9,391,997 B2 | 7/2016 | Ranjan et al. | |
| 9,426,126 B2 | 8/2016 | Murphy et al. | |
| 9,438,571 B2 | 9/2016 | White et al. | |
| 9,497,158 B2 | 11/2016 | Levasseur et al. | |
| 9,537,839 B2 | 1/2017 | Mardikar | |
| 9,577,988 B2 | 2/2017 | Rao et al. | |
| 9,584,451 B2 | 2/2017 | Adams et al. | |
| 9,590,955 B2 | 3/2017 | Chestnut et al. | |
| 9,602,473 B2 | 3/2017 | Robertson et al. | |
| 9,628,269 B2 | 4/2017 | Little et al. | |
| 9,686,417 B2 | 6/2017 | Jahr | |
| 9,706,398 B2 | 7/2017 | Frederick et al. | |
| 9,712,515 B2 | 7/2017 | Sanjeev et al. | |
| 9,767,458 B2 | 9/2017 | Dorsey et al. | |
| 9,769,127 B2 | 9/2017 | Rowley | |
| 9,781,149 B1 | 10/2017 | Himler et al. | |
| 9,807,065 B2 | 10/2017 | Ranjan et al. | |
| 9,860,751 B2 | 1/2018 | Mardikar | |
| 9,864,865 B2 | 1/2018 | Levasseur et al. | |
| 9,930,190 B2 | 3/2018 | Jahr | |
| 9,967,242 B2 | 5/2018 | Parthasarathy et al. | |
| 10,027,701 B1 | 7/2018 | Himler et al. | |
| 10,075,469 B1* | 9/2018 | Brown | H04L 51/23 |
| 10,142,268 B2 | 11/2018 | Khan et al. | |
| 10,264,413 B1 | 4/2019 | Bogineni et al. | |
| 10,348,670 B2 | 7/2019 | Levasseur et al. | |
| 10,419,448 B2 | 9/2019 | Parthasarathy et al. | |
| 10,582,379 B2 | 3/2020 | Youn et al. | |
| 10,595,201 B2 | 3/2020 | Mardikar | |
| 10,601,764 B2 | 3/2020 | Levasseur et al. | |
| 10,601,794 B2 | 3/2020 | Srinivasan et al. | |
| 10,609,525 B1 | 3/2020 | Dar et al. | |
| 11,005,829 B1 | 5/2021 | Johnson et al. | |
| 11,528,601 B1 | 12/2022 | Zaki | |
| 2002/0032641 A1 | 3/2002 | Mendiola et al. | |
| 2002/0178277 A1 | 11/2002 | Laksono | |
| 2003/0188159 A1 | 10/2003 | Josset et al. | |
| 2004/0025014 A1 | 2/2004 | Kaler et al. | |
| 2004/0098589 A1 | 5/2004 | Appenzeller et al. | |
| 2004/0196978 A1 | 10/2004 | Godfrey et al. | |
| 2004/0205248 A1 | 10/2004 | Little et al. | |
| 2004/0205330 A1 | 10/2004 | Godfrey et al. | |
| 2004/0260778 A1 | 12/2004 | Banister et al. | |
| 2005/0207379 A1 | 9/2005 | Shen et al. | |
| 2006/0021038 A1 | 1/2006 | Brown et al. | |
| 2006/0026671 A1* | 2/2006 | Potter | H04L 63/205 726/7 |
| 2006/0136724 A1 | 6/2006 | Takeshima et al. | |
| 2007/0005713 A1 | 1/2007 | Levasseur et al. | |
| 2007/0143407 A1 | 6/2007 | Avritch et al. | |
| 2007/0160203 A1 | 7/2007 | Sudhakar | |
| 2007/0276862 A1 | 11/2007 | Toutonghi | |
| 2008/0101598 A1* | 5/2008 | Dillaway | H04L 63/20 380/44 |
| 2008/0285756 A1 | 11/2008 | Chuprov et al. | |
| 2009/0150675 A1 | 6/2009 | Cook | |
| 2009/0187759 A1 | 7/2009 | Marsico | |
| 2009/0257593 A1 | 10/2009 | Losovsky | |
| 2010/0017597 A1* | 1/2010 | Chandwani | H04L 63/0823 713/155 |
| 2010/0042689 A1 | 2/2010 | Doggett | |
| 2010/0122089 A1 | 5/2010 | Godfrey et al. | |
| 2010/0144378 A1 | 6/2010 | Futty et al. | |
| 2010/0159962 A1 | 6/2010 | Cai et al. | |
| 2010/0304766 A1 | 12/2010 | Goyal | |
| 2011/0116614 A1 | 5/2011 | Strieter et al. | |
| 2012/0042166 A1 | 2/2012 | Gandhi et al. | |
| 2012/0230488 A1 | 9/2012 | De | |
| 2012/0254324 A1 | 10/2012 | Majeti et al. | |
| 2012/0314864 A1 | 12/2012 | Ramprasad et al. | |
| 2013/0007459 A1 | 1/2013 | Godfrey et al. | |
| 2013/0024686 A1 | 1/2013 | Drucker | |
| 2013/0096998 A1 | 4/2013 | Raleigh | |
| 2013/0124863 A1 | 5/2013 | Drucker | |
| 2013/0125219 A1 | 5/2013 | Raleigh | |
| 2013/0138951 A1 | 5/2013 | Gandhi et al. | |
| 2013/0138960 A1 | 5/2013 | Drucker | |
| 2013/0283045 A1 | 10/2013 | Li et al. | |
| 2013/0318344 A1 | 11/2013 | Brown et al. | |
| 2013/0326213 A1 | 12/2013 | Murphy et al. | |
| 2014/0068262 A1 | 3/2014 | Robertson et al. | |
| 2014/0129835 A1 | 5/2014 | Suryavanshi et al. | |
| 2014/0162619 A1 | 6/2014 | Nicholson et al. | |
| 2014/0179358 A1 | 6/2014 | Khan et al. | |
| 2014/0179360 A1 | 6/2014 | Jackson et al. | |
| 2014/0181933 A1 | 6/2014 | Sanjeev et al. | |
| 2014/0185806 A1 | 7/2014 | Mardikar | |
| 2014/0273987 A1 | 9/2014 | Price | |

(56) References Cited

U.S. PATENT DOCUMENTS

| | | |
|---|---|---|
| 2014/0295899 A1 | 10/2014 | Merrett |
| 2014/0372557 A1 | 12/2014 | Buckley et al. |
| 2015/0065180 A1 | 3/2015 | Lisbey et al. |
| 2015/0156177 A1 | 6/2015 | Murphy et al. |
| 2015/0161345 A1 | 6/2015 | Tippett |
| 2015/0229777 A1 | 8/2015 | Jahr |
| 2015/0271149 A1 | 9/2015 | Rowley |
| 2015/0281191 A1 | 10/2015 | Mardikar |
| 2015/0350895 A1 | 12/2015 | Brander et al. |
| 2016/0078448 A1 | 3/2016 | Dorsey et al. |
| 2016/0094521 A1 | 3/2016 | Rao et al. |
| 2016/0142356 A1 | 5/2016 | Nayak et al. |
| 2016/0337374 A1 | 11/2016 | Raghu et al. |
| 2016/0352692 A1 | 12/2016 | Ranjan et al. |
| 2017/0048217 A1 | 2/2017 | Biggs et al. |
| 2017/0048904 A1 | 2/2017 | Monaghan et al. |
| 2017/0063752 A1 | 3/2017 | Khan et al. |
| 2017/0111797 A1 | 4/2017 | Mardikar |
| 2017/0180393 A1 | 6/2017 | Murphy et al. |
| 2017/0317992 A1 | 11/2017 | Chadli et al. |
| 2018/0034786 A1 | 2/2018 | Srinivasan et al. |
| 2018/0063094 A1 | 3/2018 | Albrecht |
| 2018/0083935 A1 | 3/2018 | Fang et al. |
| 2018/0152462 A1 | 5/2018 | Steinbach et al. |
| 2018/0198799 A1 | 7/2018 | Parthasarathy et al. |
| 2018/0241871 A1 | 8/2018 | Sarafa et al. |
| 2018/0288615 A1 | 10/2018 | Mardikar |
| 2018/0332047 A1 | 11/2018 | Shah et al. |
| 2018/0343258 A1 | 11/2018 | Spies et al. |
| 2018/0367496 A1 | 12/2018 | Levasseur et al. |
| 2019/0238491 A1 | 8/2019 | Nayak et al. |
| 2019/0238494 A1 | 8/2019 | Levasseur et al. |
| 2019/0306101 A1 | 10/2019 | Synal et al. |
| 2019/0342275 A1 | 11/2019 | Olive et al. |
| 2019/0363881 A1 | 11/2019 | Bakalis et al. |
| 2020/0029215 A1 | 1/2020 | Mardikar |
| 2020/0099695 A1 | 3/2020 | Parthasarathy et al. |
| 2020/0119969 A1 | 4/2020 | Niederfeld et al. |
| 2021/0014182 A1 | 1/2021 | Stafford et al. |
| 2021/0176283 A1* | 6/2021 | Ippatapu ............. H04L 67/1095 |
| 2022/0060323 A1 | 2/2022 | Payne et al. |
| 2022/0207171 A1 | 6/2022 | Moataz |
| 2022/0215115 A1 | 7/2022 | Moataz |
| 2022/0217106 A1 | 7/2022 | Manas et al. |
| 2022/0377059 A1 | 11/2022 | Lyons et al. |
| 2022/0385643 A1 | 12/2022 | Movva et al. |
| 2022/0398326 A1 | 12/2022 | Shemer et al. |

FOREIGN PATENT DOCUMENTS

| | | | | |
|---|---|---|---|---|
| CN | 110545176 A | * | 12/2019 | ......... H04L 63/0435 |
| CN | 111787495 A | | 10/2020 | |
| CN | 113259096 A | * | 8/2021 | |
| WO | WO-2007051415 A1 | * | 5/2007 | ......... H04L 63/0428 |
| WO | WO-2011023082 A1 | * | 3/2011 | ......... H04L 63/0428 |
| WO | 2017092092 A1 | | 6/2017 | |
| WO | 2021211314 A1 | | 10/2021 | |
| WO | 2022010134 A1 | | 1/2022 | |
| WO | 2022105993 A1 | | 5/2022 | |

OTHER PUBLICATIONS

Isukapalli et al., "Advanced IMS Client Supporting Secure Signaling," in Bell Labs Technical Journal, vol. 12, No. 4, pp. 49-65, Winter 2008.

Kwon et al., "Integrated transport layer security: end-to-end security model between WTLS and TLS," Proceedings 15th International Conference on Information Networking, Beppu City, Oita, Japan, 2001, pp. 65-71, doi: 10.1109/ICOIN.2001.905331. (Year: 2001).

Lisonek et al., "SMS Encryption for Mobile Communication," 2008 International Conference on Security Technology, 2008, pp. 198-201.

Omara, Emad. "Messages End-to-End Encryption Overview," Technical Paper, Version 1.0, Nov. 2020, 12 pages. <www.sicurezzaegiustozia.com/wp-content/uploads/2020/messages_e2ee>.

Sharma et al., "Secure Authentication Protocol for 5G Enabled IoT Network," 2018 Fifth International Conference on Parallel, Distributed and Grid Computing (PDGC), Solan, India, 2018, pp. 621-626, doi: 10.1109/PDGC.2018.87 45799. (Year: 2018).

Wang et al., "Novel key management for 3G end-to-end encryption," 2009 Global Mobile Congress, Shanghai, China, 2009, pp. 1-7, doi: 10.1109/GMC.2009.5295873. (Year: 2009).

Wood et al., "Flexible end-to-end content security in CCN ," 2014 IEEE 11th Consumer Communications and Networking Conference (CCNC), Las Vegas, NV, USA, 2014, pp. 858-865, doi: 10.1109/CCNC.2014.6940528. (Year: 2014).

Zhao et al., "Building Secure User-to-user Messaging in Mobile Telecommunication Networks," 2008 Wireless Telecommunications Symposium, 2008, pp. 151-157.

* cited by examiner

DETERMINING AND AMELIORATING WIRELESS TELECOMMUNICATION NETWORK FUNCTIONALITIES THAT ARE IMPAIRED WHEN USING END-TO-END ENCRYPTION

CROSS-REFERENCE TO RELATED APPLICATIONS

This application is a continuation of the U.S. utility patent application Ser. No. 17/900,854 filed Aug. 31, 2022, which is a continuation of the U.S. utility patent application Ser. No. 17/342,985 filed Jun. 9, 2021 (now U.S. Pat. No. 11,528,601) both of which are incorporated herein by reference in their entireties.

BACKGROUND

Rich Communication Services (RCS) is a communication protocol between wireless telecommunication networks and between phones and a wireless telecommunication network, aimed at replacing SMS messages with a text-message system that can transmit multimedia. As part of RCS, the sender device and the receiver device can communicate using end-to-end encryption. However, end-to-end encryption can impair some functionalities associated with the wireless telecommunication network.

BRIEF DESCRIPTION OF THE DRAWINGS

Detailed descriptions of implementations of the present invention will be described and explained through the use of the accompanying drawings.

Figure 1:
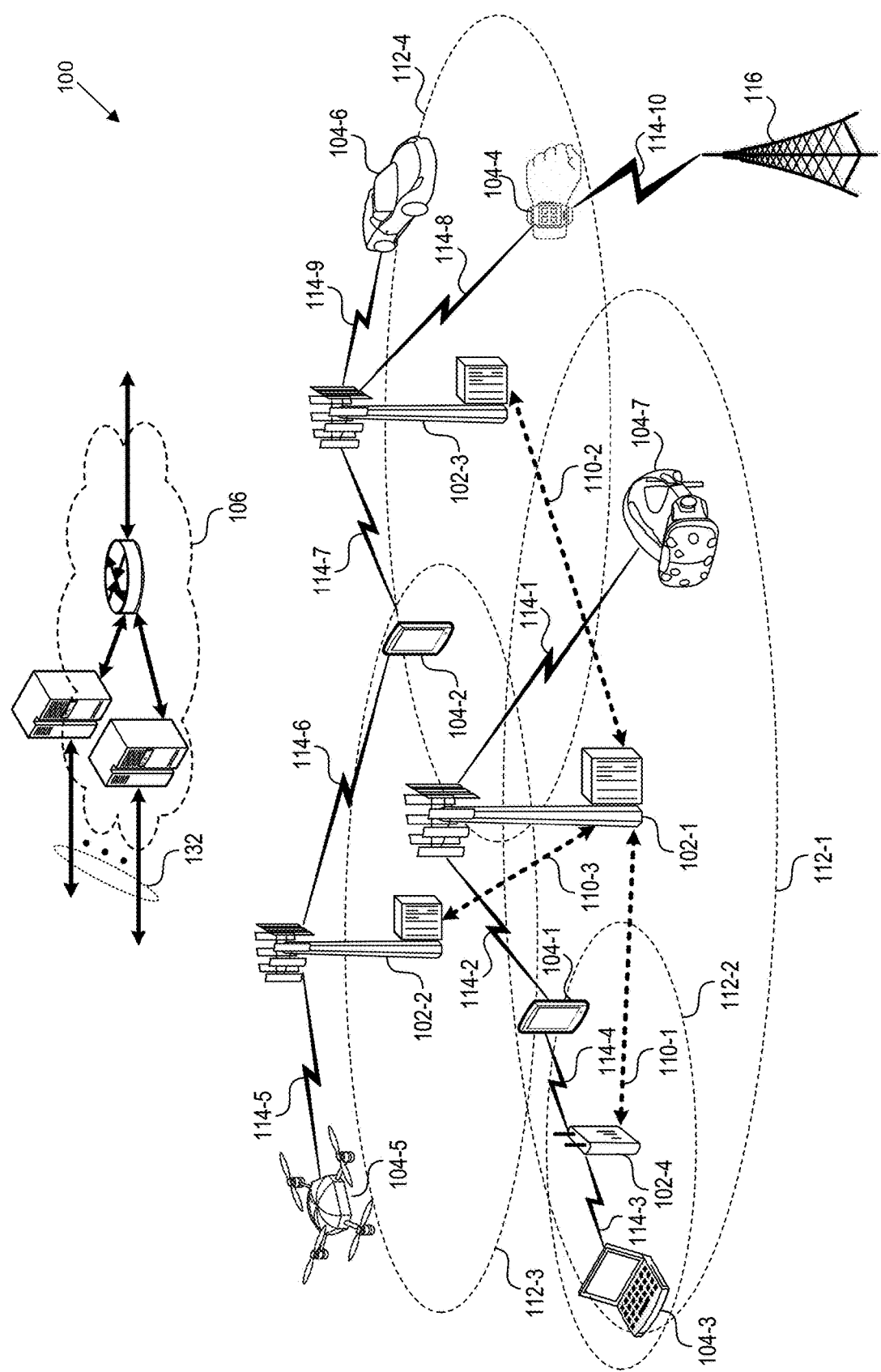
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to determine which wireless telecommunication network functionalities are impaired when using encryption and to ameliorate the impairment of the functionality. The system can receive a request from a sender device to communicate with a receiver device using RCS, where the request indicates that the sender device is capable of an end-to-end encryption. The system can determine whether the receiver device is capable of the end-to-end encryption and whether the receiver device is associated with a functionality provided by the wireless telecommunication network that is impaired when the end-to-end encryption is used.

One such functionality includes joint devices. Joint devices include one or more devices associated with the receiver device, where the wireless telecommunication network forwards the message to the receiver device and all the joint devices. However, the joint devices cannot decrypt the received message because they lack the encryption key. For example, the receiver device can be a mobile phone that receives the message, and the network decides to forward the received message to a watch or a tablet. In this case, the receiver device (the mobile phone) can decrypt the encrypted message because the receiver device is involved in negotiating the encryption keys; however neither the watch nor the tablet knows the encryption keys, and each of those receives only a garbled encrypted message. Consequently, the functionality of receiving an incoming message on additional devices is impaired.

Upon determining that the receiver device or one of the joint devices is not capable of the end-to-end encryption or that the functionality is impaired, the system can refuse to engage in the end-to-end encryption. For example, the system can send a message to the sender device informing the sender device that the receiver device is not capable of the end-to-end encryption, and can instruct the sender device to send a non-encrypted message.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network formed by the network 100 also include wireless devices 104-1 through 104-7 (referred to individually as "wireless device 104" or collectively as "wireless devices 104") and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographical coverage areas 112-1 through 112-4 (also referred to individually as "coverage area 112" or collectively as "coverage areas 112"). The geographical coverage area 112 for a base station 102 can be divided into sectors making up only a portion of the coverage area (not shown). The network 100 can include base stations of different types (e.g., macro and/or small cell base stations). In some implementations, there can be overlapping geographical coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographical area (e.g., several kilometers in radius) and can allow access by wireless devices that have service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographical area and can allow unrestricted access by wireless devices that have service subscriptions with the network provider. A femto cell covers a relatively smaller geographical area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-7, a portable gaming console, or a wirelessly connected sensor that provides data to a remote server over a network).

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Figure 2:
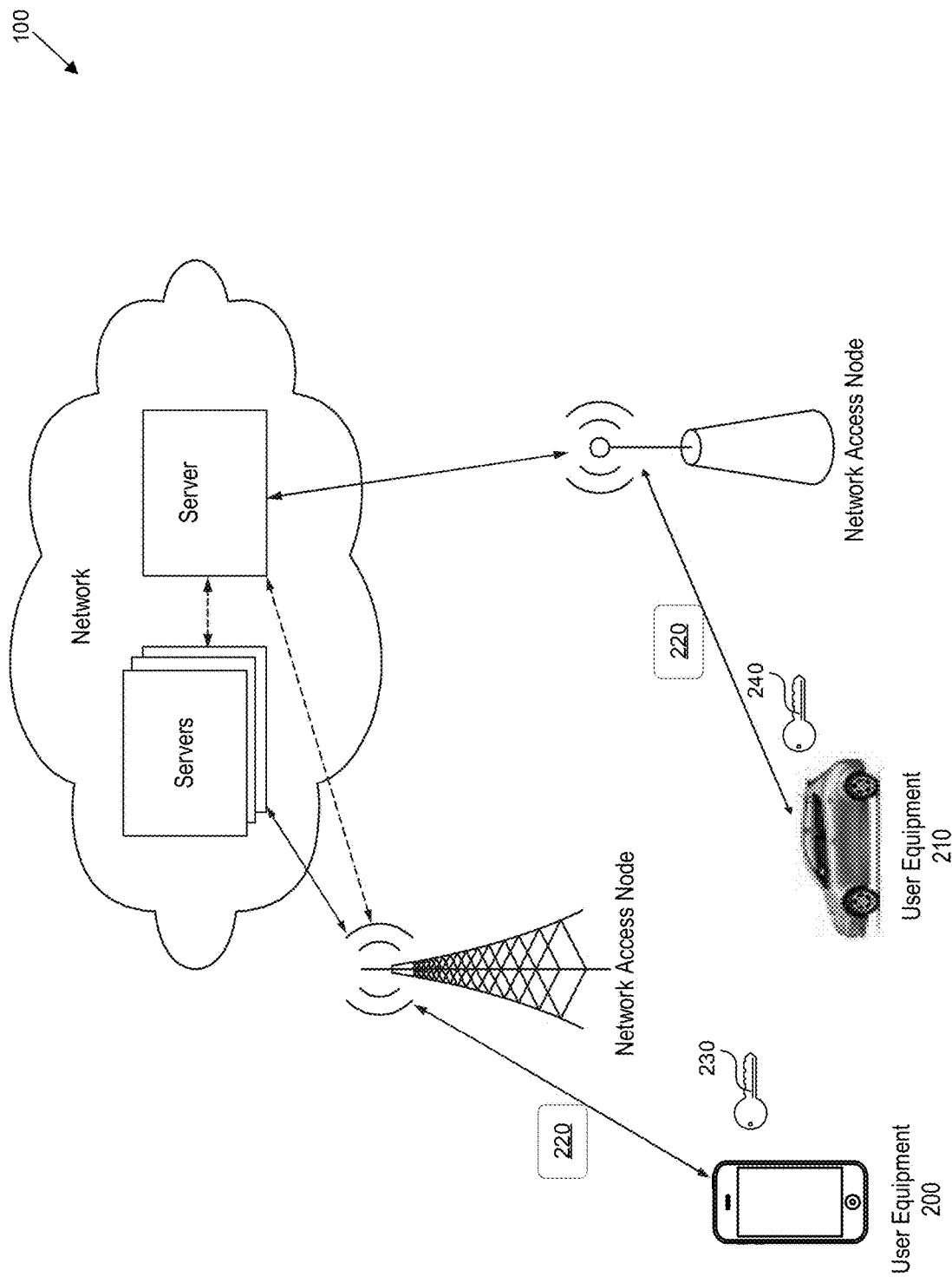
FIG. 2 shows two electronic devices communicating with each other over a wireless telecommunication network.

Determining and Ameliorating Wireless Telecommunication Network Functionalities that are Impaired when Using End-to-End Encryption FIG. 2 shows two electronic devices communicating with each other over a wireless telecommunication network. Two user equipment devices (UEs) 200, 210 can communicate with each other using the network 100. The UEs 200, 210 can both be a sender device or a receiver device. The UEs 200, 210 can be any device used directly by an end-user to communicate, and can be a cell phone, a smart watch, a laptop computer, a vehicle equipped to communicate with the network 100, etc.

The UEs 200, 210 can communicate using RCS. RCS is a communication protocol between wireless telecommunication networks and between UEs 200, 210 and network 100, aimed at replacing Short Message Service (SMS) and Multimedia Messaging Service (MMS) messages with a text-message system that is richer, provides phonebook polling (for service discovery), and can transmit in-call multimedia. In addition, RCS can be used to send messages, pictures, audio, phone contacts, and/or video files. RCS can provide the sender or receiver with status updates, such as whether the sender/receiver is online or offline, is the sender/receiver typing, did sender/receiver receive the message, approximately how many minutes has the sender/receiver been away, etc. RCS can provide all the functionality of third-party messaging applications such as OTTs including WhatsApp, Viber, Facebook, etc., without requiring the user to install a third-party application. RCS can provide the functionality to the user through the preloaded messaging application, such as an SMS application, that is installed with the operating system, without requiring the user to download an additional third-party application.

The messages 220 sent between UEs 200, 210 can use end-to-end encryption for security. Prior to sending the message 220 between UEs 200, 210, the UEs can engage in a secure negotiation to establish a set of cryptographic keys 230, 240 to be used in encrypting and decrypting the message 220. The cryptographic keys 230, 240 can be the same key. For example, the sender device 200 can encrypt the message 220 using a first cryptographic key 230, where the encrypted message 220 can be decrypted using the second cryptographic key 240 known to the receiver device 210. Once the receiver device 210 receives the message 220, the receiver device can decrypt the message using the cryptographic key 240.

Figure 3A:
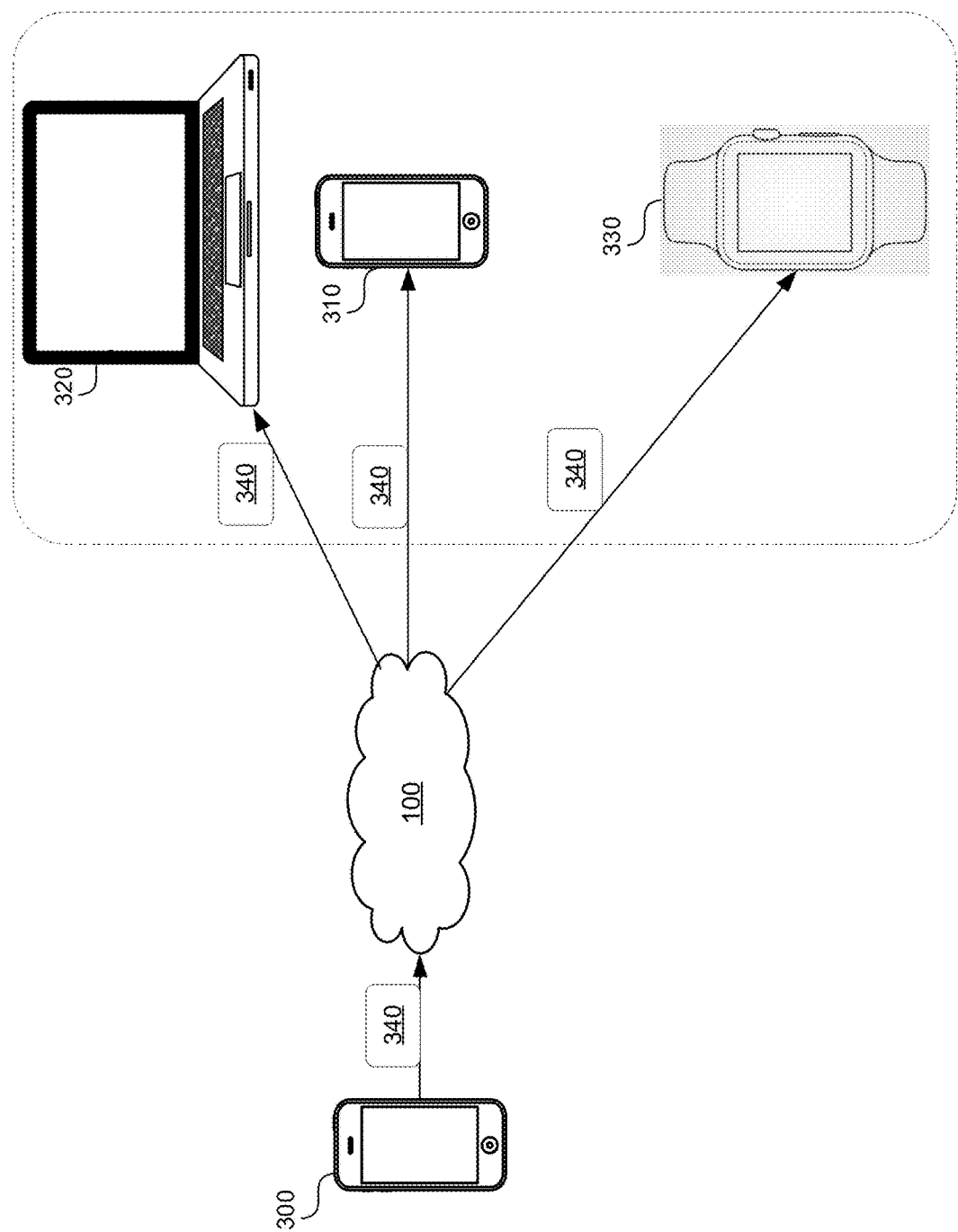
FIGS. 3A-3C show situations in which problems with end-to-end encryption can arise.
Figure 3B:
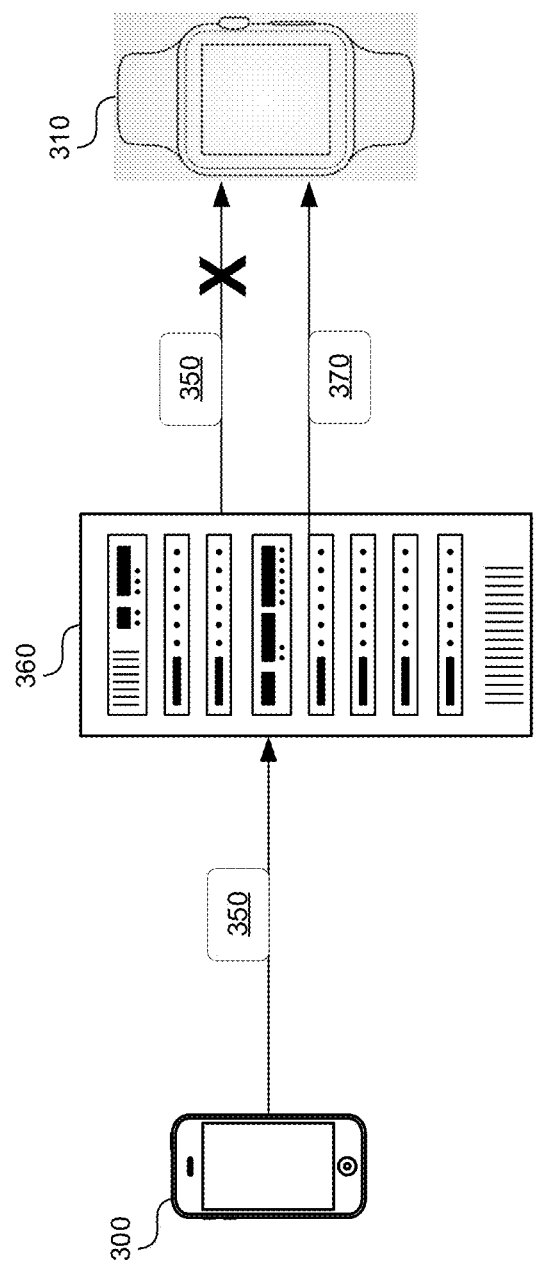
Figure 3C:
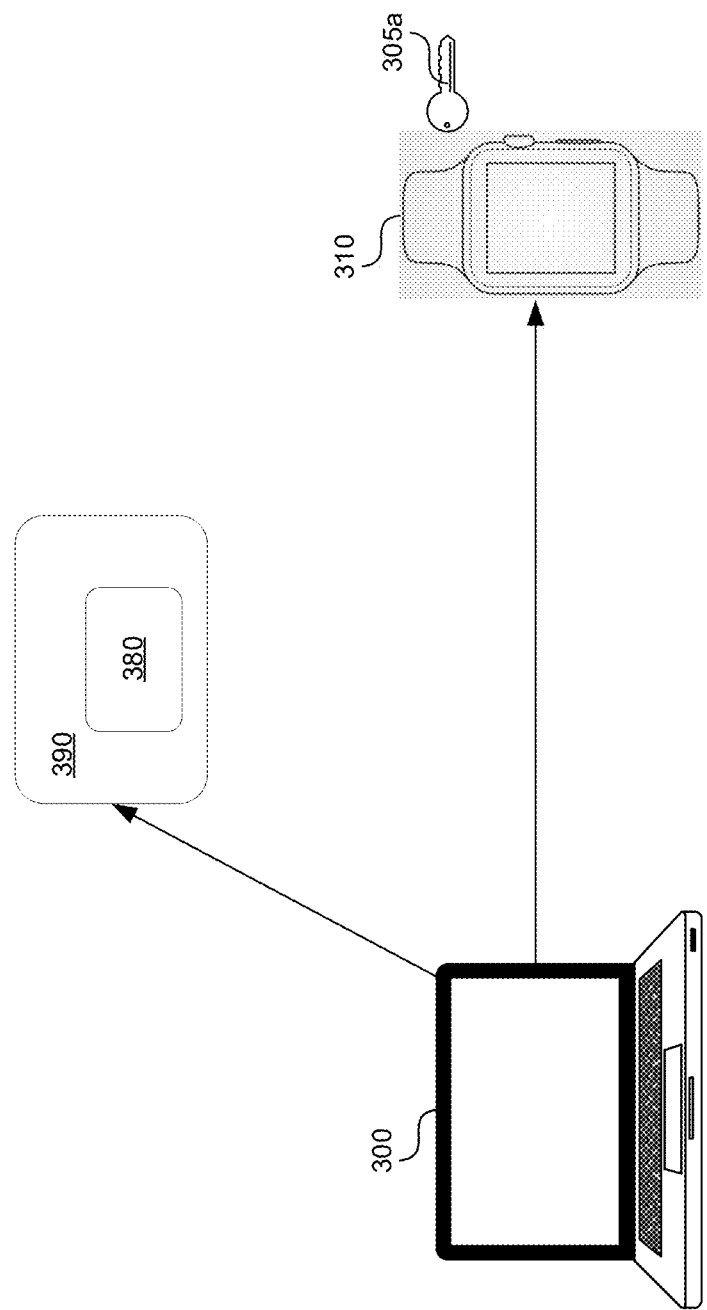

FIGS. 3A-3C show situations in which problems with end-to-end encryption can arise. Problems can arise when the receiver device 310 is associated with a functionality provided by the network 100, where the functionality is impaired when the end-to-end encryption is used to communicate between the sender device 300 and the receiver device 310.

As seen in FIG. 3A, the receiver device 310 can have multiple additional devices 320, 330 associated with it. For example, the receiver device 310 and the additional devices associated with 320, 330 can all have wireless transceivers and subscriber identity module (SIM) cards (physical or virtual) to permit wireless communication between them, such as cellular communication using the 3G/4G/5G 3GPP protocols. The receiver device 310 can be the primary device. Any messages 340 that the receiver device 310 receives (e.g. messages sent to its mobile identification number) the network 100 can forward to the devices 320, 330. The receiver device 310 and the sender device 300 can negotiate the cryptographic keys, and as a result only the receiver device 310 has access to the cryptographic keys, while the devices 320, 330 do not. As a result, when the sender device 300 sends encrypted message 340 to the receiver device 310, the network 100 can forward the encrypted message 340 to the devices 320, 330; however, the message received by the devices 320, 330 is garbled because those devices do not have the decryption key. Consequently, the functionality provided by the network 100, namely, sending the same message to multiple devices, is impaired.

To ameliorate the impaired functionality and thereby provide higher quality of service (QoS), the network 100 can decline to engage in the end-to-end encryption when the receiver device 310 has multiple additional associated devices 320, 330. The network 100 can instruct the sender device 300 to send a non-encrypted message. Alternatively, the network 100 can send the encrypted message 340 only to the receiver device 310, without sending the encrypted message to the devices 320, 330. Additionally, the network 100, upon delivering the encrypted message 340, can send an unencrypted message to the devices 320, 330 to indicate that there is a new message on the device 310.

As seen in FIG. 3B, the sender device 300 can send an RCS message 350 to the receiver device 310 via a network server 360. If the server 360 sends the RCS message 350 to the receiver device 310, and the receiver device does not receive the RCS message 350 because, for example, the receiver device 310 is not configured to receive the RCS message, the server 360 can translate the RCS message into an SMS or an MMS message 370, and can attempt to resend the translated message to the receiver device 310.

If the RCS message 350 is encrypted, as described in this application, and the receiver device 310 receives the SMS or the MMS version of the encrypted RCS message 350, the receiver device 310 cannot decrypt the SMS or the MMS message 370 because the SMS or the MMS application does not have encryption key since the SMS or the MMS application is not encryption capable. Consequently, the receiver device 310 receives a garbled message, and the functionality provided by the network 100, namely, translating an RCS message to an SMS or an MMS message is impaired.

To ameliorate the impaired functionality, in one embodiment, the network 100 can instruct the server 360 to not translate the RCS message 350 upon failure to deliver, and instead instruct it to hold the RCS message 350 and attempt to deliver the RCS message at a predetermined period, such as every 15 minutes for the next 1 to 3 days. In another embodiment, if the server 360 is configured to translate the RCS message 350 into the SMS or MMS message 370, the server 360 can inform the sender device 300 to not encrypt the message 350. In a third embodiment, if the server 360 fails to deliver the encrypted RCS message 350, either after the first try or after 1 to 3 days, the server can request that the sender device 300 send an unencrypted message.

As seen in FIG. 3C, the sender device 300 can send a file 380 to the receiver device 310 via a database 390, for example, a repository. The database 390 can store the file 380, and the receiver device 310 can receive a message containing a link to the file 380. If the communication between the sender device 300 and the receiver device 310 is encrypted, the file 380 is encrypted and stored in the database 390 and can be decrypted using the encryption key 305a.

The encryption key 305a can expire after occurrence of a predetermined event. In one embodiment, the predetermined event can be a passage of a predetermined period of time. In another embodiment, the predetermined event can be a maximum number of encryption keys. For example, the receiver device 310 can be engaged in multiple conversations with multiple sender devices 300. The receiver device 310 can store an encryption key 305a for each conversation. However, the receiver device 310 can have the maximum number (n) of encryption keys 305a-n such as key 305a (only one labeled for brevity) that it stores. The maximum number of encryption keys, n, can be 100. When the receiver device 310 engages in a 101st conversation, the receiver device 310 negotiates a new encryption key, and replaces one of the old encryption keys, such as key 305a, with the new encryption key. Consequently, the encryption key 305a is lost to the receiver device 310. If the receiver device 310 does not retrieve the file 380 from the database 390 before the encryption key 305a is lost to the receiver device 310, the receiver device 310 cannot subsequently decrypt the file 380. Consequently, the functionality provided by the network 100, namely, file sharing between devices 300, 310 is impaired.

To ameliorate the impaired functionality, in one embodiment, the network 100 can instruct the sender device 300 to not encrypt the file 380. In another embodiment, the receiver device 310 can determine which encryption keys 305a-n associated with the receiver device 310 are associated with a file that has not been viewed and can retain those encryption keys. In a third embodiment, the receiver device 310 can send periodic reminders to the user to retrieve the file 380.

Figure 4A:
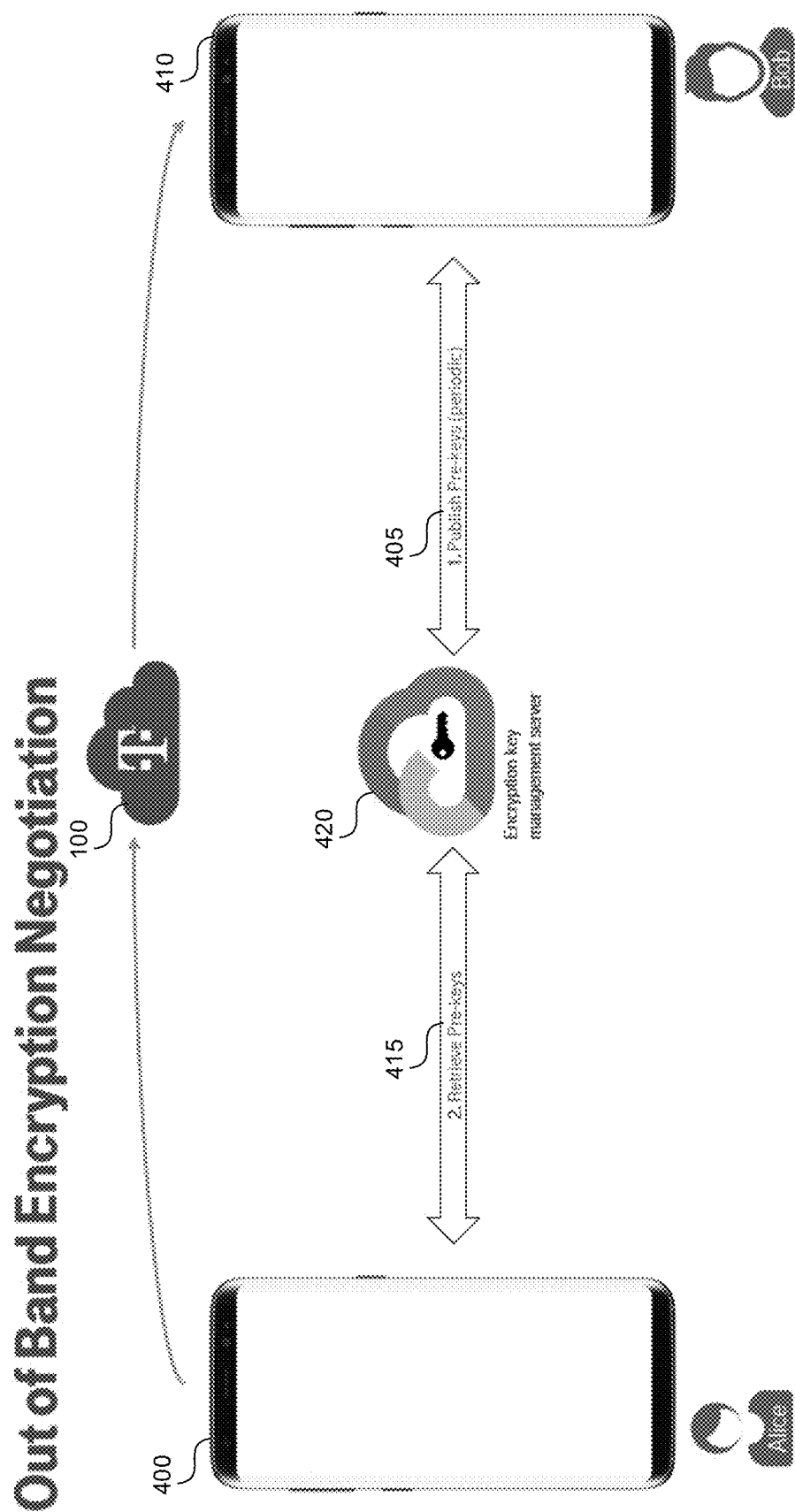
FIG. 4A shows out of band encryption key negotiation.
Figure 4B:
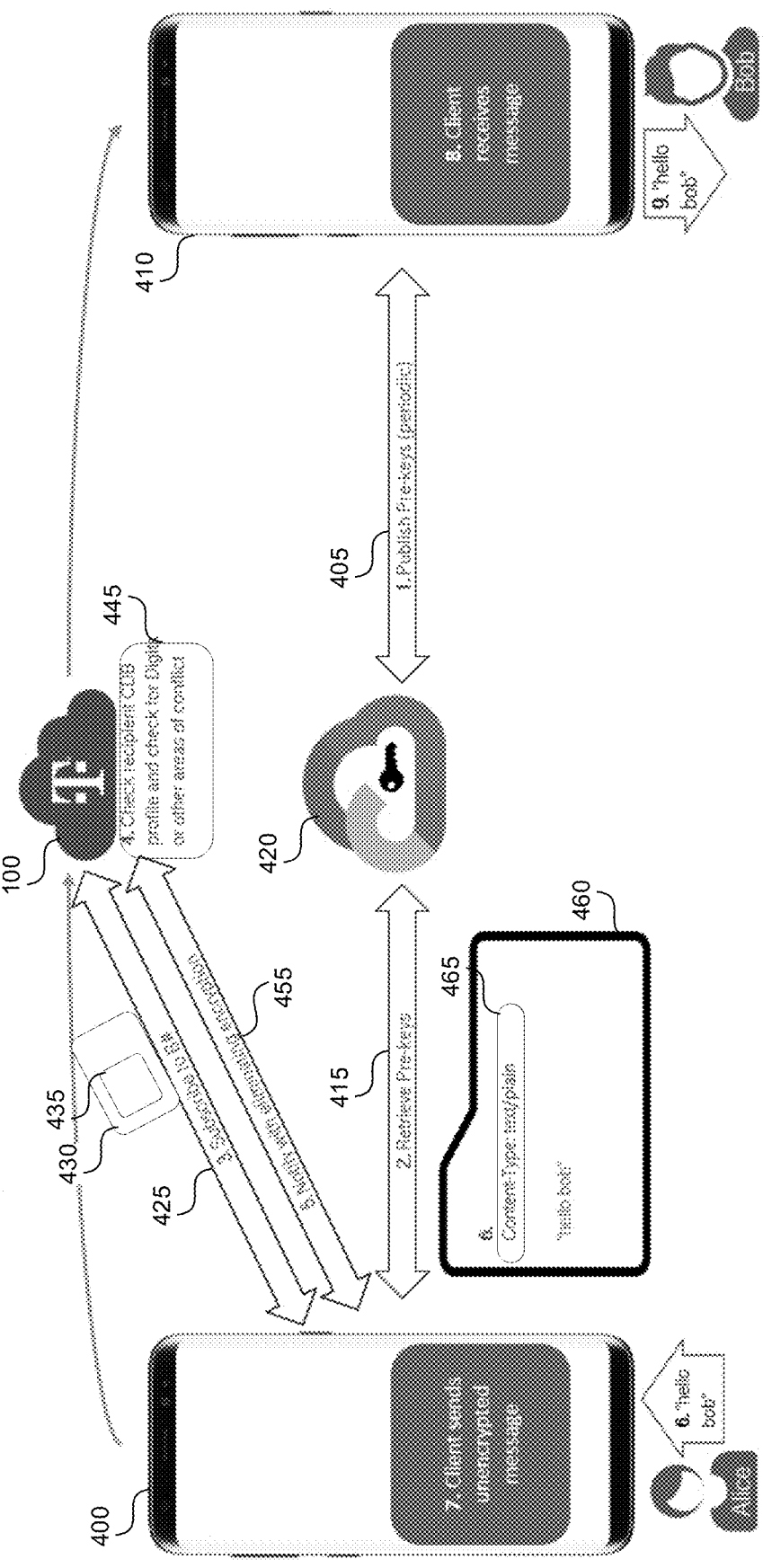
FIG. 4B shows how the network controls the encryption capability but not the encryption key.

FIG. 4A shows out of band encryption key negotiation. Out of band encryption key negotiation happens outside of the wireless telecommunication network 100 and with the help of a third party 420. Initially, in step 405, a third party 420 outside of the network 100 can publish encryption key generation materials and send them to the receiver device 410. The third party can be the encryption provider, such as Google, Facebook, Microsoft, etc. In step 415, the third party 420 can send the encryption key generation materials to the sender device 400. Based on encryption key generation materials, the sender device 400 and the receiver device 410 can generate the encryption key according to a predetermined key generation algorithm, such as a key generation function. FIG. 4B show show the network controls the encryption capability but not the encryption key.

In step 425, the sender device 400 can send a message 430 to the network 100 to request communication with the receiver device 410 using RCS with encryption. To indicate the need for encryption, the message 430 can include a feature tag 435 requesting encrypted communication. Before proceeding with encrypted RCS communication, in step 445, the network 100 can determine the capability of the receiver device 410, by checking the receiver device 410 Converged Database (CDB) profile, and checking whether the receiver device 410 uses any functionality that is impaired through encryption, such as functionalities described in FIGS. 3A-3C. CDB contains profiles for the users and their corresponding devices, so that the network 100 can trigger different call flows depending on the profiles.

In step 455, if the network 100 determines that the receiver device 410 is not capable of encryption or is associated with the functionality that is impaired with encryption, the network can indicate to the sender device 400 to not send a non-encrypted message. Alternatively, the network can implement a solution as described in this application. If the sender device 400 receives the instruction to send a non-encrypted message, the sender device sends the non-encrypted message 460 with the feature tag 465, which the receiver device 410 receives. The feature tag 465 states "content-type: text/plain" to indicate that the message 460 is not encrypted.

Figure 5:
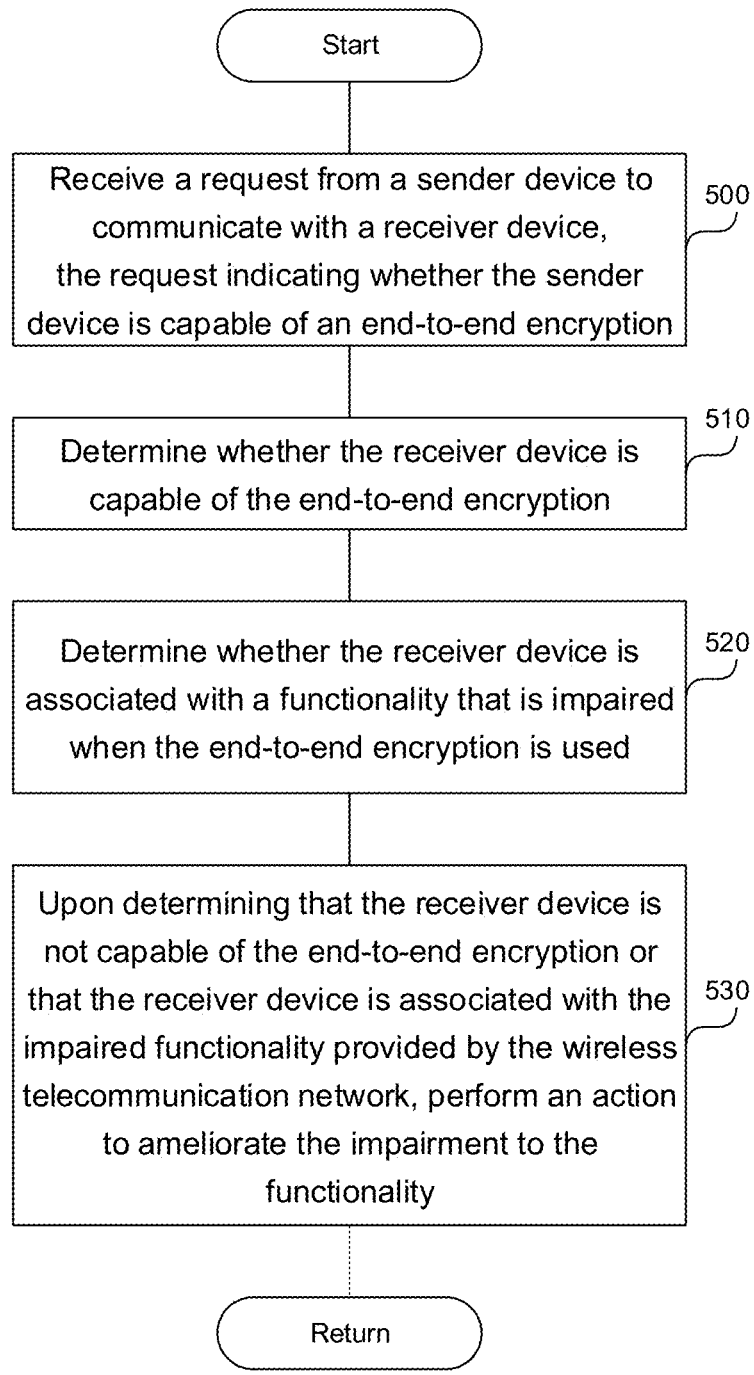
FIG. 5 is a flowchart that illustrates a process to establish encrypted communication between two devices, while ameliorating any functionality impairment.

FIG. 5 is a flowchart that illustrates a process to establish encrypted communication between two devices, while ameliorating any functionality impairment. In step 500, the hardware or software processor executing instructions described in this application can receive a request from a sender device to communicate with a receiver device. The requests can be sent using the RCS protocol. The request can indicate whether the sender device is capable of an end-to-end encryption.

In step 510, the processor can determine whether the receiver device is capable of the end-to-end encryption. The processor can determine whether the receiver device is capable of the end-to-end encryption upon occurrence of a predetermined event. The predetermined event can include the first time the receiver device sends or receives the message. The predetermined event can also occur every other time the receiver device sends or receives a message.

In step 520, the processor can determine whether the receiver device is associated with a functionality provided by a wireless telecommunication network, where the functionality is impaired when the end-to-end encryption is used to communicate between the sender device and the receiver device. The network can set up a network database to check functionality of all receiving devices and any associated devices. The network can then store the functionality information for all future RCS communications in a database so that the network can retrieve the necessary information from the database to determine whether the receiver device is encryption capable.

Also, could the system just set up network database to check functionality of all receiving devices (and any "associated devices") to determine functionality, then store that for all future RCS communications so that the server need only quickly make that check and needn't use network resources sending and receiving this message under step 520

In one embodiment, to determine whether the receiver device is associated with the functionality that is impaired, the processor can determine whether multiple devices are associated with the receiver device, where each device among the multiple devices is configured to receive a copy of a message when the receiver device receives the message, as described in FIG. 3A. Even if the receiver device can engage in the end-to-end encryption, each device among the multiple devices is not configured to engage in the end-to-end encryption, because the encryption key negotiation is conducted between the sender device and the receiver device, and the other devices are not privy to the communication. Consequently, when the receiver device receives encrypted communication, and forwards a copy of encrypted communication to the associated devices, the associated devices cannot decrypt the encrypted communication because they do not have the appropriate encryption key. Upon determining that the receiver device is one of the joint devices, the processor can determine that the functionality of forwarding received messages to associated devices is impaired.

To ameliorate the impaired functionality, in one embodiment, the processor can refuse to engage in end-to-end encryption messaging between the sender device and the receiver device. In another embodiment, the processor can send an encrypted message from the sender device to the receiver device, without sending the encrypted message to the multiple devices. For example, the processor can instruct the receiver device to not forward the encrypted message to the multiple devices. In addition, the receiver device upon receiving the encrypted communication can send a notification to each device among multiple devices to view the encrypted message on the receiver device, without sending the encrypted message to the multiple devices.

In another embodiment, to determine whether the receiver device is associated with the functionality that is impaired, the processor can determine whether a server after an attempt to deliver an RCS message from the sender device to a receiver device converts the RCS message to an SMS message or an MMS message, as described in FIG. 3B. Upon making the determination that the server converts the message, the server can determine that the receiver device is associated with the functionality that is impaired because once the encrypted RCS message is sent as an SMS or an MMS message, the receiver device applications responsible for translating SMS or MMS messages do not have access to the decryption key to decrypt the encrypted message.

To ameliorate the impaired functionality, in one embodiment, the processor can refuse to engage in end-to-end encryption between the sender device and the receiver device when the server is configured to translate the message into SMS or MMS. In another embodiment, the processor can instruct the server to retain the RCS message and to reattempt sending the RCS message to the receiver device over the next 1 to 3 days, in predetermined intervals, such as every 15 minutes.

In a third embodiment, to determine whether the receiver device is associated with the functionality that is impaired, the processor can determine whether the sender device is engaged in encrypted file transfer, as described in FIG. 3C. Encrypted file transfer can include sending an encrypted file to a repository and sending a link to the receiver device to retrieve the encrypted file. The file encryption and the link need to be negotiated and sent over RCS so that the receiver device has the appropriate encryption key to decrypt the encrypted file. If the receiver device is associated with functionalities described in FIGS. 3A-3B, decrypting the file can be a problem because the associated devices may not have the encryption key or because the receiver device received the RCS message as an MMS or an SMS. The solutions to such problems are described in this application.

In addition, in the end-to-end encryption, the encryption key can be configured to change upon occurrence of a predetermined event, such as a passage of time, or the use of N encryption keys. When the N+1st encryption key needs to be generated, one of the previous encryption keys is revoked. Once the previous encryption key is revoked, and the file encrypted with the revoked key has not been retrieved, the file in the repository is lost. Consequently, the functionality of the file transfer is impaired.

To ameliorate the impaired functionality, in one embodiment, the processor can instruct the sender device to engage in non-encrypted file transfer with the receiver device. In another embodiment, the processor can obtain a list of marked receiver devices whose encryption keys cannot expire, for example, receiver devices associated with authorities. Consequently, when new encryption keys are negotiated in the end-to-end encryption, encryption keys of marked devices are not negotiated for a predetermined amount of time, such as 10 years.

In step 530, upon determining that the receiver device is not capable of the end-to-end encryption or that the receiver device is associated with the impaired functionality provided by the wireless telecommunication network, the processor can perform an action to ameliorate the impairment to the functionality. To ameliorate the impairment, the processor can send instruct the sender device to send a non-encrypted message to the receiver device. Alternatively, the processor can send a message to the recipient device informing the recipient device that the sender device has sent an encrypted message that cannot be displayed on the recipient device. In addition, the processor can instruct the sender device to forgo the encrypted message and send un-encrypted message instead.

To communicate the encryption capability of the sender device and of the receiver device, the processor can create a feature tag in an RCS message passed between the sender device and the receiver device, where the feature tag indicates whether the sender device or the receiver device is capable of the end-to-end encryption.

Computer System

Figure 6:
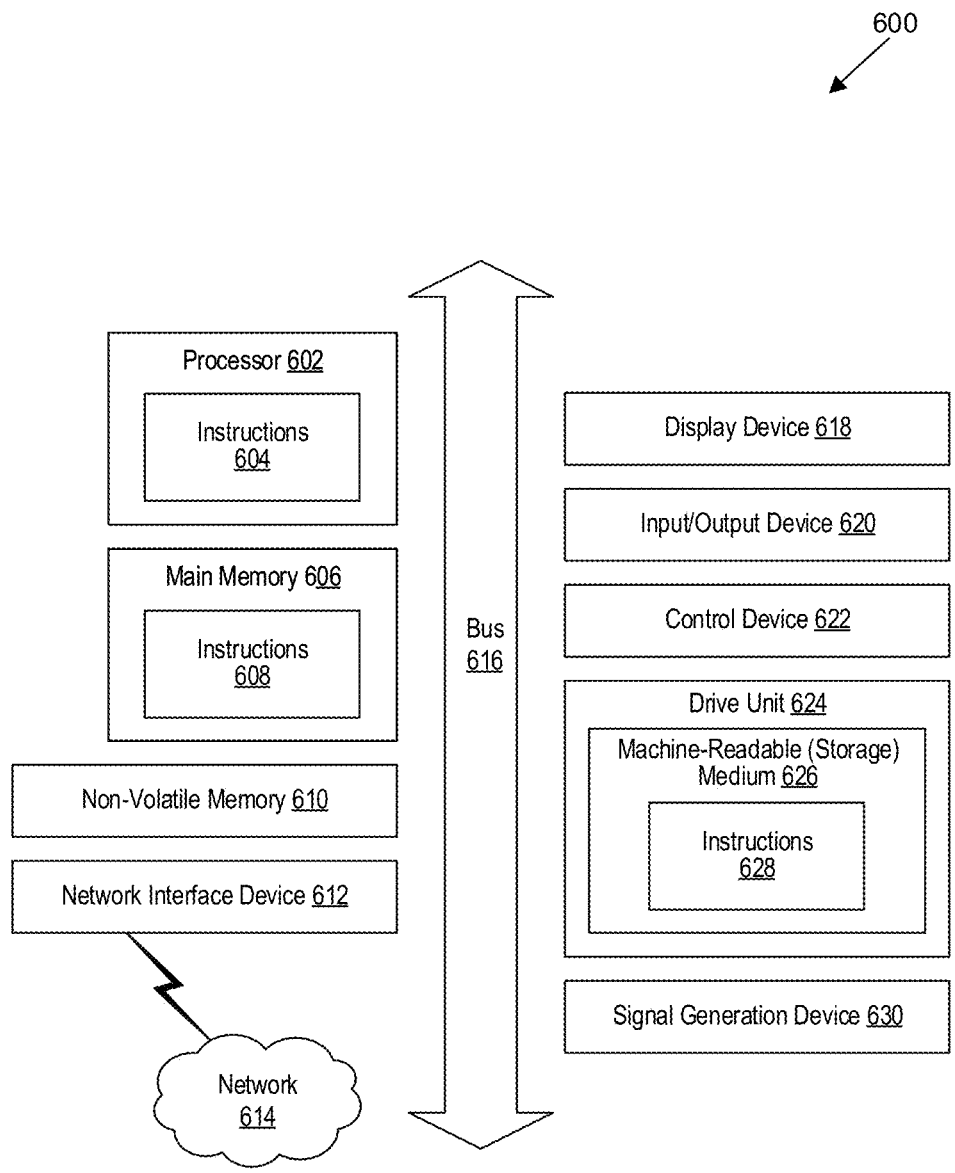
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630, that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The processor 602 of the computer system 600 can implement the instructions described in this application, for example, in FIG. 5. The processor 602 can be associated with the network 100 in FIG. 1; server 420 in FIG. 4; and/or UEs 200, 210 in FIG. 2, 300, 310, 320, 330 in FIGS. 3A-3C, and 400, 410 in FIG. 4. The main memory 606, the non-volatile memory 610, and/or the drive unit 624 can store the instructions as described in this application. The network 614 can be a wired or a wireless network used to communicate between network 100, server 420, and/or UEs 200, 210 300, 310, 320, 330, 400, 410.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real-time, near real-time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical discs, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

REMARKS

The terms "example," "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated upon or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or a continuing application.

I claim:

1. A non-transitory computer-readable storage medium comprising executable instructions that, when executed by a processor of a system, cause the system to:
   receive a request from a first wireless device to communicate with a second wireless device, wherein the request indicates whether the first wireless device is capable of using an encryption technique;
   determine whether the second wireless device is capable of using the encryption technique;
   determine whether the second wireless device is associated with at least one function provided via a wireless telecommunication network that could be impaired when the encryption technique is used to communicate between the first and second wireless devices; and
   upon determining that the second wireless device is not capable of using the encryption technique or that the second wireless device is associated with impairment of the at least one function, perform an action to ameliorate the impairment of the at least one function which includes:
      determine whether the second wireless device is configured to engage in the encryption technique;
      send an encrypted message to the second wireless device while ensuring it is not sent to a wireless device that is not configured to engage in the encryption technique; and
      send an unencrypted message to the wireless device indicating there is a new message on the second wireless device.

2. The non-transitory computer-readable storage medium of claim 1, wherein the instructions to ameliorate the impairment further comprise instructions to:
   hold an encrypted message upon failing to deliver the encrypted message; and
   attempt to deliver the encrypted message at a predetermined period, wherein a cessation of the attempts to deliver occurs after a predetermined length of time.

3. The non-transitory computer-readable storage medium of claim 1, wherein the instructions to ameliorate the impairment further comprise instructions to:
   cause the second wireless device to determine an encryption key associated with the second wireless device and associated with an encrypted message that has not been viewed at the second wireless device;
   cause the second wireless device to retain the encryption key; and
   cause the second wireless device to send periodic reminders to a user to retrieve the encrypted message using the encryption key.

4. The non-transitory computer-readable storage medium of claim 1, wherein the instructions to ameliorate the impairment further comprise instructions to:
   obtain a list of marked second wireless devices whose encryption keys cannot expire, wherein the list of marked second wireless devices include a particular second wireless device associated with authorities;
   determine whether the second wireless device is in the list of marked second wireless devices; and
   upon determining that the second wireless device is included in the list of marked second wireless devices, eschew negotiating a new encryption key associated with the second wireless device for a predetermined amount of time.

5. The non-transitory computer-readable storage medium of claim 1, wherein the instructions to ameliorate the impairment further comprise instructions to: send a message to the first wireless device instructing the first wireless device to send an unencrypted message.

6. A method comprising:
   receiving a request from a first UE to communicate with a second UE, wherein the request indicates whether the first UE is capable of using an encryption technique;
   determining whether the second UE is capable of using the encryption technique;
   determining whether the second UE is associated with at least one function provided via a wireless telecommunication network that could be impaired when the encryption technique is used to communicate between the first and second UEs; and
   upon determining that the second UE is not capable of using the encryption technique or that the second UE is associated with impairment of the at least one function, performing an action to ameliorate the impairment of the at least one function which includes:
      determining whether the second wireless device is configured to engage in the encryption technique;
      sending an encrypted message to the second wireless device while ensuring it is not sent to a wireless device that is not configured to engage in the encryption technique; and
      sending an unencrypted message to the wireless device indicating there is a new message on the second wireless device.

7. The method of claim 6, wherein the ameliorating the impairment comprises:
   upon failing to deliver an encrypted message, holding the encrypted message; and
   attempting to deliver the encrypted message at a predetermined period, wherein a cessation of the attempts to deliver occurs after a predetermined length of time.

8. The method of claim 6, wherein the ameliorating the impairment comprises:
   causing the second UE to determine an encryption key associated with the second UE and associated with an encrypted message that has not been viewed;
   causing the second UE to retain the encryption key; and causing the second UE to send periodic reminders to a user to retrieve the encrypted message using the encryption key.

9. The method of claim 6, wherein the ameliorating the impairment comprises:
obtaining a list of marked second UEs whose encryption keys cannot expire;
determining whether the second UE is in the list of marked second UEs; and
upon determining that the second UE is included in the list of marked second UEs, eschewing negotiating a new encryption key associated with the second UE for a predetermined amount of time.

10. A system comprising: at least one hardware processor; and at least one non-transitory memory storing instructions, which, when executed by the at least one hardware processor, cause the system to:
receive a request from a first wireless device to communicate with a second wireless device, wherein the request indicates whether the first wireless device is capable of using an encryption technique;
determine whether the second wireless device is capable of using the encryption technique;
determine whether the second wireless device is associated with at least one function provided via a wireless telecommunication network that could be impaired when the encryption technique is used to communicate between the first and second wireless devices; and
upon determining that the second wireless device is not capable of using the encryption technique or that the second wireless device is associated with impairment of the at least one function, perform an action to ameliorate the impairment of the at least one function which includes:
determine whether the second wireless device is configured to engage in the encryption technique;
send an encrypted message to the second wireless device while ensuring it is not sent to a wireless device that is not configured to engage in the encryption technique; and
send an unencrypted message to the wireless device indicating there is a new message on the second wireless device.

11. The system of claim 10, the instructions to ameliorate the impairment comprising instructions to:
upon failing to deliver an encrypted message, hold the encrypted message; and
attempt to deliver the encrypted message at a predetermined period, wherein a cessation of the attempts to deliver occurs after a predetermined length of time.

12. The system of claim 10, the instructions to ameliorate the impairment comprising instructions to:
cause the second wireless device to determine an encryption key associated with the second wireless device and associated with an encrypted message that has not been viewed;
cause the second wireless device to retain the encryption key; and
cause the second wireless device to send periodic reminders to a user to retrieve the encrypted message using the encryption key.

13. The system of claim 10, the instructions to ameliorate the impairment comprising instructions to:
obtain a list of marked second wireless devices whose encryption keys cannot expire, wherein the list of marked second wireless devices include a particular second wireless device associated with authorities;
determine whether the second wireless device is in the list of marked second wireless devices; and
upon determining that the second wireless device is included in the list of marked second wireless devices, eschew negotiating a new encryption key associated with the second wireless device for a predetermined amount of time.

14. The system of claim 10, the instructions to ameliorate the impairment comprising instructions to: send a message to the first wireless device instructing the first wireless device to send an unencrypted message.

* * * * *